United States Patent [19]

Iwata et al.

[11] Patent Number: 4,562,997
[45] Date of Patent: Jan. 7, 1986

[54] SHOCK ABSORBER ASSEMBLY FOR AUTOMOTIVE VEHICLE SUSPENSION

[75] Inventors: Kazuro Iwata, Zushi; Naoto Fukushima, Kamakura; Toji Takemura, Yokohama, all of Japan

[73] Assignee: Nissan Motor Company, Limited, Japan

[21] Appl. No.: 469,414

[22] Filed: Feb. 24, 1983

[30] Foreign Application Priority Data

Apr. 14, 1982 [JP] Japan .................................. 57-62180
Aug. 31, 1982 [JP] Japan ................................ 57-151199

[51] Int. Cl.⁴ .............................................. F16F 1/12
[52] U.S. Cl. .................................... 267/8 R; 267/170;
277/152; 277/206 A
[58] Field of Search ............... 267/8 R, 8 A, 34, 60, 267/61 R, 61 S, 158, 160, 161, 162, 170, 171, 174, 175, 176, 177, 178, 179, 182, 28, 29, 8 B, 8 C, 8 D, 9 R, 9 B, 9 A, 9 C; 248/597, 598; 308/2 A; 277/152, 153, 205, 206 A; 280/668

[56] References Cited

U.S. PATENT DOCUMENTS

| | | | |
|---|---|---|---|
| 3,157,392 | 11/1964 | Kitamura | 267/60 |
| 3,368,824 | 2/1968 | Julien | 267/34 |
| 3,561,747 | 2/1971 | Donnelly | 267/161 |
| 3,953,010 | 4/1976 | De Vos | 267/34 |

FOREIGN PATENT DOCUMENTS

| | | | |
|---|---|---|---|
| 1571657 | 6/1969 | France . | |
| 2229566 | 12/1974 | France | 267/8 R |
| 2259711 | 8/1975 | France . | |
| 53-124825 | 10/1978 | Japan | 267/34 |
| 58-33304 | 3/1983 | Japan . | |
| 1245658 | 9/1971 | United Kingdom | 267/34 |
| 1468907 | 3/1977 | United Kingdom . | |

*Primary Examiner*—Bruce H. Stoner, Jr.
*Assistant Examiner*—Richard R. Diefendorf
*Attorney, Agent, or Firm*—Lane and Aitken

[57] ABSTRACT

A shock absorber assembly for an automotive vehicle suspension prevents transmission of vibrations such as road shocks. The shock absorber assembly has a resiliently shock absorbing spring seat retaining a suspension coil spring. The spring seat is adapted to absorb relatively low-amplitude, high-frequency vibrations and thus prevent the shock absorbing assembly from surging. The spring seat has resilient characteristics in which the minimum damping force occurs at a position normally maintained by the vehicle and in which the spring seat becomes rigid in response to relatively high-amplitude vibrations.

21 Claims, 21 Drawing Figures

SHOCK ABSORBER ASSEMBLY FOR AUTOMOTIVE VEHICLE SUSPENSION

BACKGROUND OF THE INVENTION

The present invention relates generally to a shock absorber assembly for an automotive vehicle suspension. More particularly, the invention relates to a structure for mounting a suspension coil spring in a shock absorber assembly, which ensures a smooth ride by preventing transmission of road shocks.

In a strut-type vehicle suspension, a suspension coil spring is interpositioned between a lower spring seat secured to a shock absorber and an upper spring seat secured to a shock absorber piston rod, which is, in turn, secured to a vehicle body via a mounting insulator, for providing a resilient damping force as a shock absorber assembly. In the conventional shock absorber assembly, the ends of the suspension coil spring rigidly contact the spring seats directly or via relatively hard or rigid rubber seats. As a result, the suspension coil spring may resonate at a specific frequency of vehicle vibration or road shock to cause a surging phenomenon. This surging phenomenon unevenly stresses the suspension coil spring to degrade driving comfort and to transmit road shocks, thereby increasing the noise level in the vehicle compartment because of increased vehicle body vibration.

The present invention is intended to prevent the shock absorber assembly from exhibiting this surging phenomenon and thus to prevent transmission of road shocks. The invention is also intended to maintain the noise level in the vehicle compartment at a level lower than that experienced with conventional shock absorber assemblies.

SUMMARY OF THE INVENTION

Therefore, it is an object of the present invention to provide a shock absorber assembly which can satisfactorily and successfully eliminate a rough ride feeling and prevent an increase in the vehicular noise level caused by vehicle body vibration.

More particularly, the object of the present invention is to provide a mounting structure for a suspension coil spring in a shock absorber assembly, which structure has a means for absorbing vibration applied to the suspension coil spring to prevent transmission of a vibration between the vehicle body and a vehicle wheel axle.

In order to accomplish the objectives above-mentioned and other objects of the invention, there is provided a shock absorber assembly having a spring seat adapted to resiliently absorb vibrations of a suspension coil spring. The spring seat comprises a resilient member which is responsive to relatively low-amplitude vibrations to absorb the vibrations.

According to one aspect of the invention, a shock absorber assembly for an automotive vehicle suspension comprises a suspension strut, a shock absorber disposed within the suspension strut, a piston rod extending between a reciprocating piston disposed in the shock absorber and the suspension strut, a pair of spring seats retaining either end of the suspension coil spring, one of the spring seats being fixed onto the outer periphery of the suspension strut and the other being secured near the top of the piston, and resilient means incorporated in at least one of the spring seats for resiliently absorbing vibrations transmitted by the suspension coil spring, the resilient means being responsive to relatively low-amplitude vibrations to absorb the vibrations and reduce their transmission between the shock absorber and the suspension strut, and being responsive to relatively high-amplitude vibrations to become substantially rigid thereto.

According to another aspect of the invention, a shock absorber assembly for an automotive vehicle suspension comprises a suspension strut, a shock absorber disposed within the suspension strut, a piston rod extending between a reciprocating piston in the shock absorber and the top of the suspension strut, a suspension coil spring would around the suspension strut and around the piston rod extending from the suspension strut, a pair of spring seats retaining either end of the suspension coil spring, one of the spring seats being fixed onto the outer periphery of the suspension strut and the other being fixed to the periphery of the piston rod, resilient means incorporated in at least one of spring seats for resiliently absorbing vibrations transmitted by the suspension coil spring, the resilient means being responsive to relatively low-amplitude vibrations to be deformed to absorb the vibration and being responsive to relatively high-amplitude vibrations to become substantially rigid for transmitting the high-amplitude vibrations between the suspension coil spring and the suspension strut, the resilient means including a movable resilient ring supported by substantially rigid ring members, and lubricating means encompassing the mating surfaces between the movable resilient ring and one of the rigid ring members for lubrication thereof.

BRIEF DESCRIPTION OF THE DRAWINGS

The invention will be understood more fully from the detailed description of a preferred embodiment of the invention given herebelow and from the accompanying drawings of the preferred embodiments of the present invention, which, however, should not be taken as limiting the invention inasmuch as they are provided for elucidation and explanation only.

In the drawings.

DESCRIPTION OF THE PREFERRED EMBODIMENTS

Figure 1:
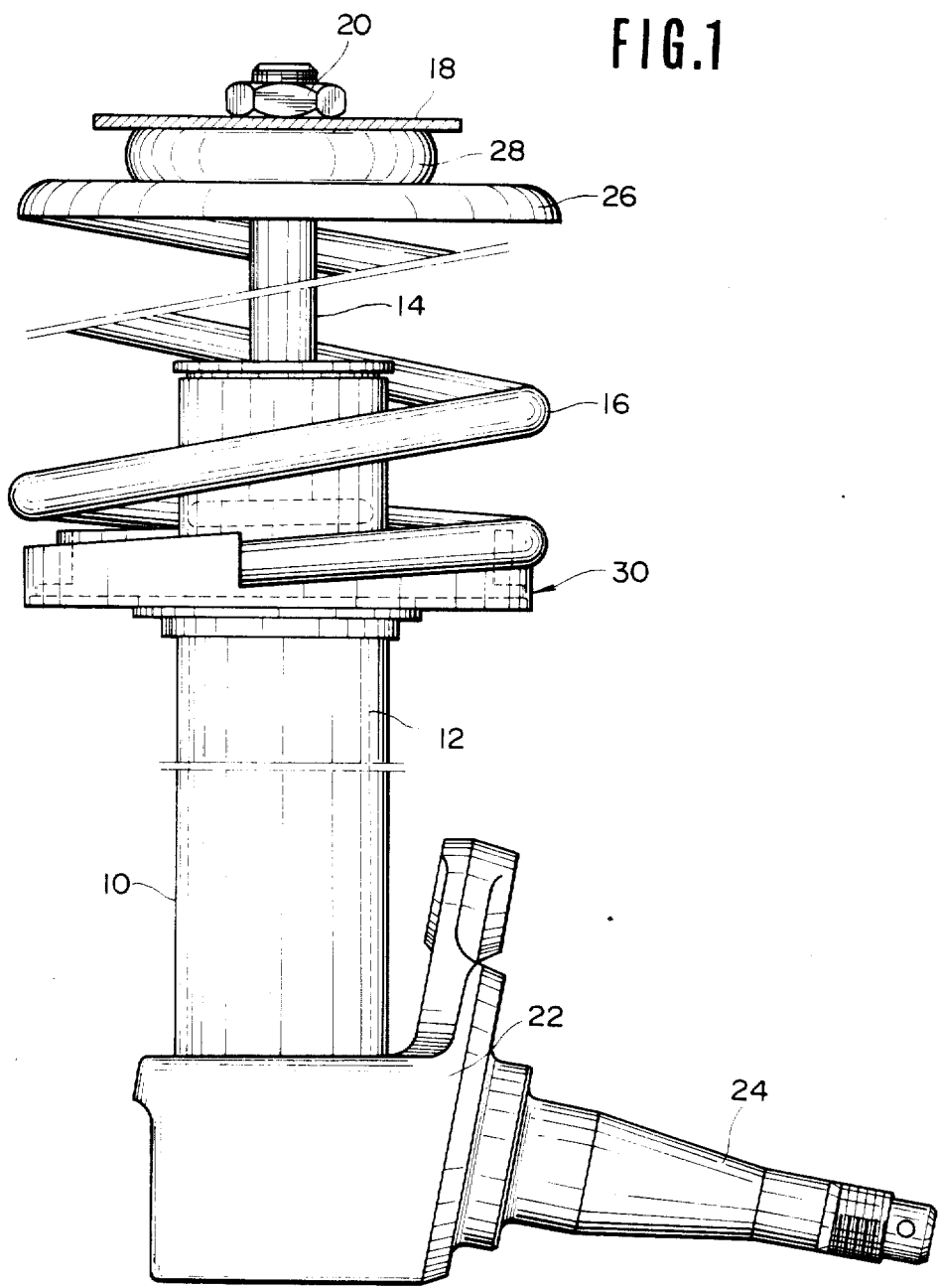
FIG. 1 is a front elevation of the first embodiment of a shock absorber assembly according to the present invention.
Figure 2:
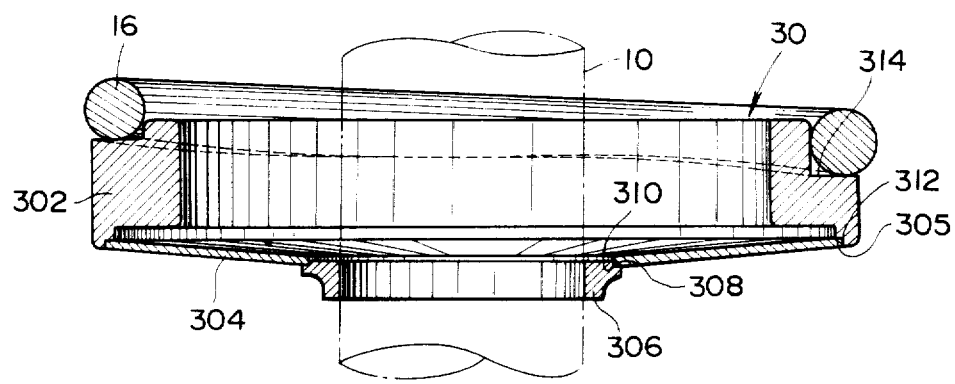
FIG. 2 is an enlarged cross-section of a spring seat in the shock absorber assembly of FIG. 1.
Figure 3:
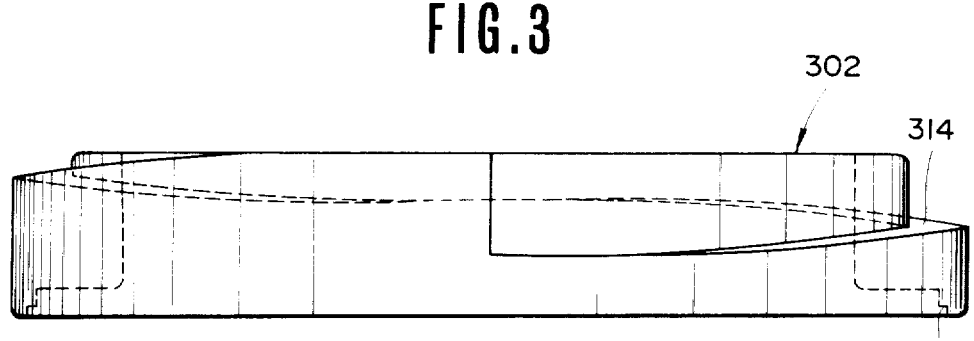
FIG. 3 is a front elevation of a seat member of the spring seat of FIG. 2.
Figure 4:
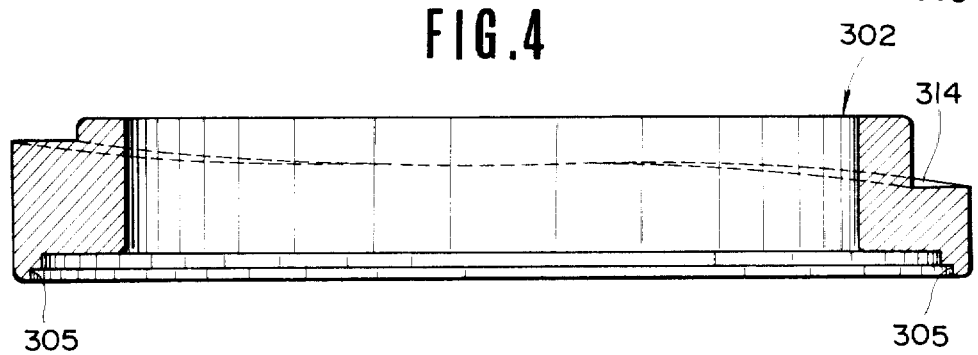
FIG. 4 is a cross-section of the seat member of FIG. 3.
Figure 5:
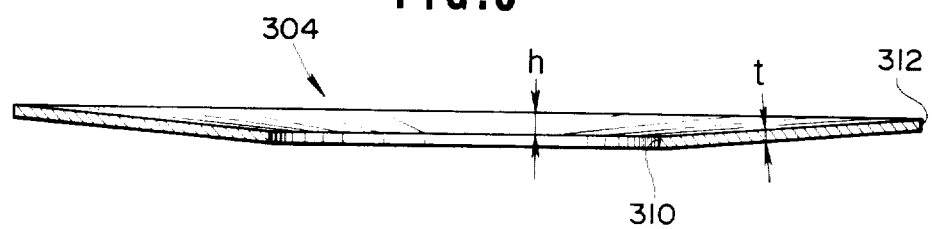
FIG. 5 is a cross-section of a spring disc in the spring seat of FIG. 2.
Figure 6:
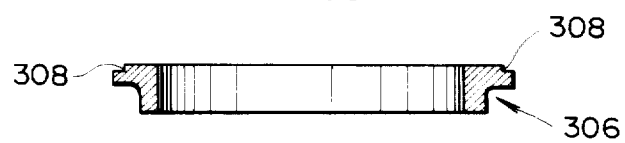
FIG. 6 is a cross-section of a fitting member for fitting the spring seat onto a suspension strut or to a piston rod of a shock absorber.

Referring now to the drawings, particularly to FIG. 1, there is illustrated the first embodiment of a shock absorber assembly according to the present invention. The shock absorber assembly generally comprises a strut tube 10 releasably receiving a shock absorber 12 with a thrusting piston rod 14. A suspension coil spring 16 is wound around the outer periphery of the suspension strut and the thrusting piston rod 14. The threaded top of the piston rod 14 is secured to a vehicle body 18 by a fixing nut 20. On the other hand, the lower end of the suspension strut 10 is secured to a steering knuckle 22. The steering knuckle 22 has a spindle 24 on which a wheel hub (not shown) and a road wheel (not shown) are mounted. The fixing nut 20 serves to adjust an initial stress applied to the shock absorber assembly when installed in the vehicle suspension.

As is well known, the shock absorber 12 is adapted to produce a damping force against vertical forces which cause relative displacement between the wheel axle and the vehicle body. In such cases, the thrusting piston rod 14 is displaced axially with respect to the suspension strut to generate a damping force to counteract the original vertical displacement. The suspension coil spring 16 also resists vertical forces to hold the spatial relationship between the wheel axle and the vehicle body constant.

An upper spring seat 26 is secured near the top of the thrusting piston rod. The upper spring seat 26 contacts an elastic mounting insulator 28 which absorbs relatively small-amplitude vibrations applied to the shock absorber 12 via the suspension strut 10. A lower spring seat 30 is secured to the outer periphery of the suspension strut. The ends of the coil spring 16 are retained by the upper and lower spring seats 26 and 30 so as to exert tensional force thereon and thus hold the vehicle body at a predetermined level with respect to the wheel axle.

As shown in FIGS. 2 to 6, the lower spring seat 30 comprises an annular seat member 302, a resilient spring disc 304 and an annular fitting member 306. The fitting member 306 is fixedly secured to the outer periphery of the suspension strut 10 along the vertically-aligned inner periphery thereof, by way of welding for example. The fitting member 306 is formed with a circumferentially extending rest portion 308 onto which the inner peripheral edge 310 of the spring disc 304 seats.

Similarly, the seat member 302 is formed with a rest 305 extending around the lower, inner edge thereof to receive the outer peripheral edge 312 of the spring disc 304. The outer and upper peripheral edge of the seat member 302 also defines a circumferentially extending rest 314 which supports the lower end of the suspension coil spring 16.

The spring disc 304 has a substantially annular dish-shaped configuration arranged such that the outer peripheral edge is at a vertically higher position than the inner peripheral edge. In the preferred embodiment, the vertical dimension h between the inner and outer peripheral edges 310 and 312 is chosen so as to be in the range of from 1.2 to 1.5 times the thickness t of the spring disc. The spring disc 304 is designed to have such a vertical stiffness that it will be flattened by the static vertical force exerted thereon when the shock absorber is initially mounted on the vehicle body.

Figure 7:
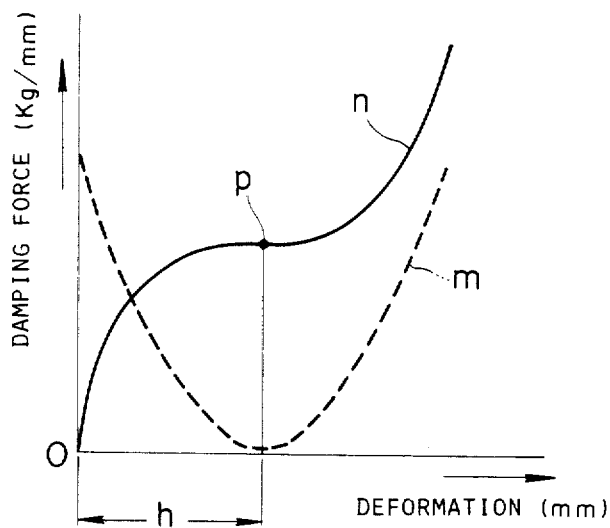
FIG. 7 shows the variation of damping force created by the spring disc in relation to the deformation magnitude of the spring disc.

The variation of the resilient force of the spring disc 304 in relation to the vertical deformation thereof will be appreciated from FIG. 7.

In FIG. 7, the variation of the spring coefficient m of the spring disc 304 is represented by the broken line and has non-linear characteristics. As will be seen from FIG. 7, the spring coefficient m is minimized when the spring disc 304 is deformed by an amount corresponding to the dimension h, i.e. when the spring disc is deformed to be approximately flat. The solid line in FIG. 7 represents the variation of the damping force n generated in response to vertical forces. As will be appreciated, the damping force n against vertical forces becomes substantially constant in the range of vertical forces around p which corresponds to a deformation of magnitude h of the spring disc. The damping force increases according to the non-linear characteristics of the spring disc 304 as illustrated by the solid line in FIG. 7. Therefore, the rate of increase thereof gradually decreases as the vertical force approaches the force p. Therefore, by applying a vertical force p to the spring disc 304 when initially mounting the shock absorber assembly onto the vehicle body, the damping force n created by the spring disc 304 can be made to be approximately constant and the spring coefficient under these conditions will be approximately minimized. Therefore, under these conditions, the spring disc 304 can be easily deformed in response to vertical forces to absorb vertical forces applied thereto and thus prevent transmission of the vertical forces between the suspension coil spring and the suspension strut.

On the other hand, as will be appreciated from FIG. 7, since the damping force increases non-linearly as the deformation of the spring disc increases beyond the magnitude h, the spring disc 304 will soon act as a substantially rigid member with respect to vertical forces.

Therefore, relatively high-frequency, low-amplitude vibrations applied to the shock absorber which can not be absorbed by the shock absorber or the suspension coil spring can be effectively absorbed by the spring disc 304 to prevent transmission of the vibrations transmitted from the road wheels via the wheel axle to the vehicle body. If the vibrations have a relatively high amplitude, i.e. if they deform the spring disc by a significant magnitude, the spring disc will become substantially rigid. However, the suspension coil spring and/or shock absorber can effectively absorb such vibrations.

Figure 8:
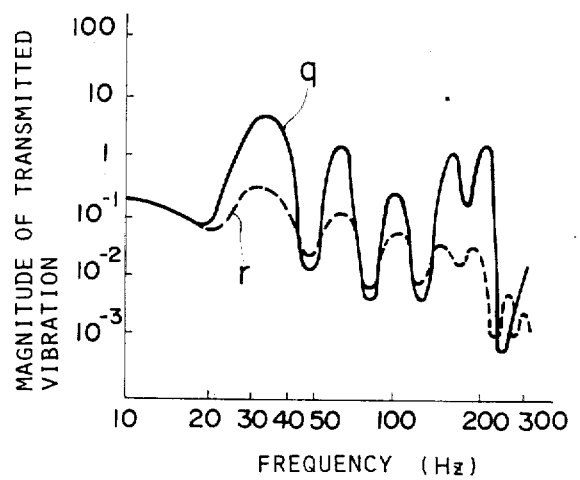
FIG. 8 shows the variation of the vibration transmitting characteristics in the shock absorber assembly in relation to the frequency of the vibration applied thereto.

FIG. 8 shows the vibration transmission characteristics of the shock absorber assembly of the shown embodiment in comparison to that of a conventional assembly. In FIG. 8, the vibration transmission characteristics of the shock absorber assembly of the present invention are illustrated by the broken line and the characteristics of the conventional system are illustrated by the solid line. As can be appreciated herefrom, the magnitude of vibrations transmitted to the vehicle body are substantially reduced by the shown first embodiment and the surging phenomenon is eliminated.

It should be noted that although the shown embodiment is provided with a resilient shock-absorbing spring seat for the lower spring seat in the shock absorber assembly, it is of course possible to provide resilient shock absorbing spring seats for both upper and lower spring seats or to provide a resilient shock absorbing spring seat for the upper spring seat. Furthermore, for the present invention, any kind of shock absorber, e.g., hydraulic shock absorber, pneumatic shock absorber or hydropneumatic shock absorber can be employed.

Figure 9:
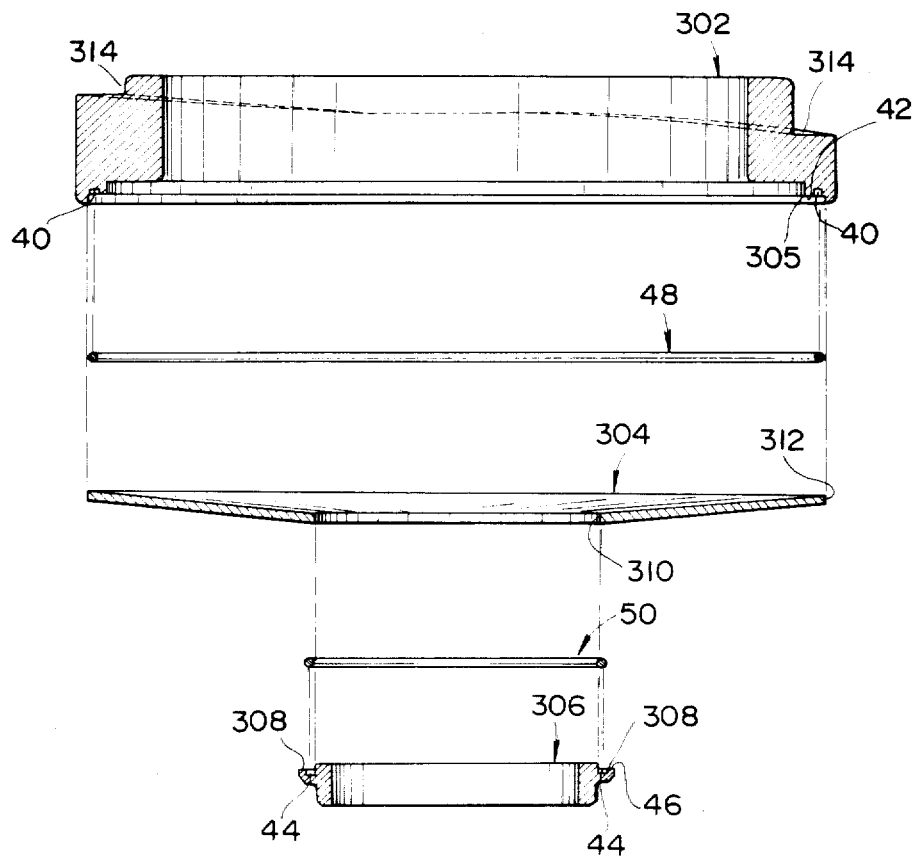
FIG. 9 is a cross-sectional exploded view of a major part of the second embodiment of the shock absorber assembly according to the present invention.
Figure 10:
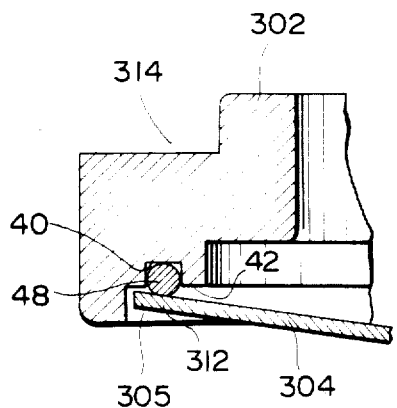
FIG. 10 is an enlarged view of the outer peripheral portion of the spring seat of FIG. 9 as assembled.
Figure 11:
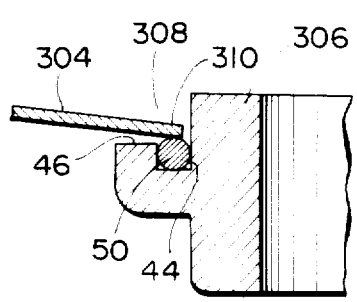
FIG. 11 is an enlarged view of the inner periphral portion of the spring seat of FIG. 9 as assembled.

FIG. 9 shows the second embodiment of the shock absorber assembly according to the present invention. This embodiment is intended to reduce wear on the seat member and the fitting member, which are made of metal by a molding process, due to friction between the peripheral edges of the spring disc, which may be made of spring steel, and the elements in contact with the edge of the spring disc. In this embodiment, a circumferentially extending groove 40 is formed in a horizontal plane 42 of the circumferencially extending rest 305 of the seat member 302. The groove 40 is located along a locus of points in the horizontal plane which come into contact with the outer peripheral edge 312 of the spring disc 304. Similarly, a circumferentially extending groove 44 is formed in a horizontal plane 46 of the rest portion 308 of the fitting member 306 along a locus of points which come into contact with the inner peripheral edge of the spring disc 304. Relatively hard metal rings 48 and 50, made from a piano wire, for example, are received in the grooves 40 and 44, as shown in FIGS. 10 and 11.

The hardness $H_S$ of the metal ring 48 and 50 is preferably so related to the hardness $H_D$ of the spring disc 304 in Rockwell hardness that $|H_S - H_D| = 10$. More preferably, the hardness $H_S$ of the metal ring 48 and 50 is selected to be smaller than that $H_D$ of the spring disc.

It should be noted that although in the shown embodiment, the metal rings 48 and 50 both defined endless rings having diameters respectively corresponding to that of the respective grooves 40 and 44, it is also possible to use lengths of wire which, when inserted into the groove, do not necessarily describe a complete circle.

This structure prevents wear on the seat member and the spring disc, which prolongs the working lifetime thereof and increases the durability of the shock absorber assembly.

Figure 12:
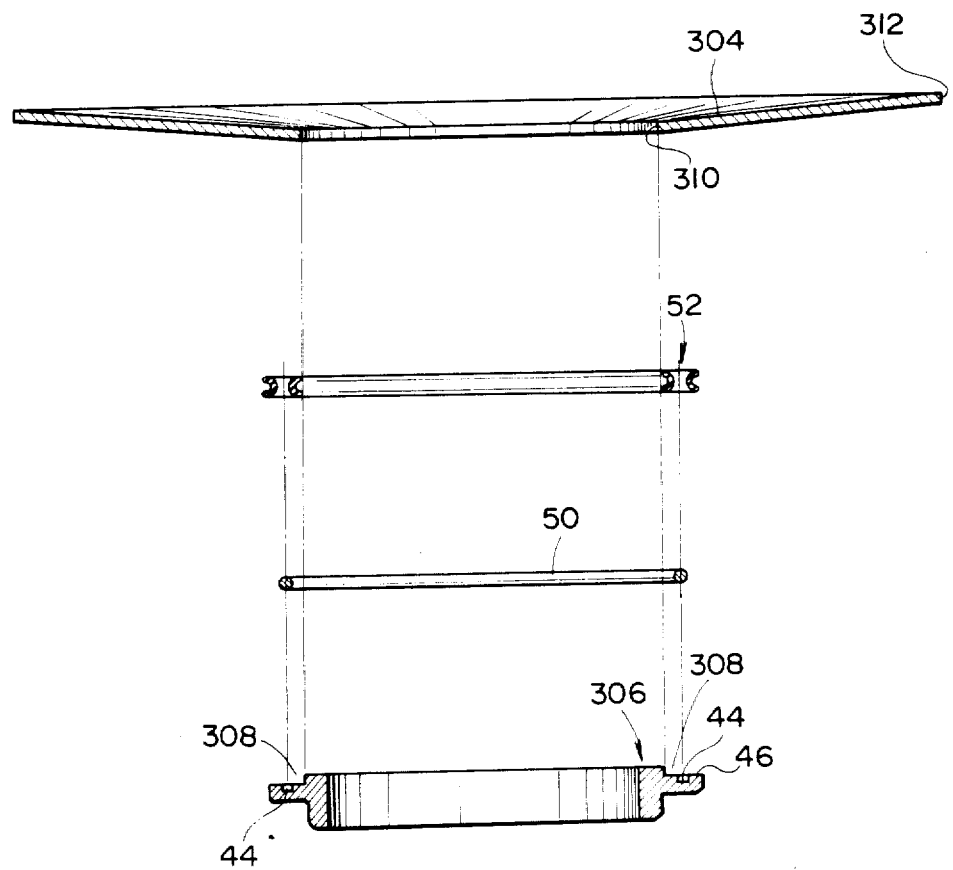
FIG. 12 is a cross-sectional exploded view of the major part of the shock absorber assembly according to the third embodiment of the invention.

FIG. 12 shows the third embodiment of the shock absorber assembly, in which a layer of lubricant is provided between each of the inner and outer edges 310 and 312 of the spring disc 304 and the corresponding metal rings 48 and 50. To retain the lubricant, sealing members 52 are provided which define annular lubricant chambers 54 around the metal rings 48 and 50.

Figure 13:
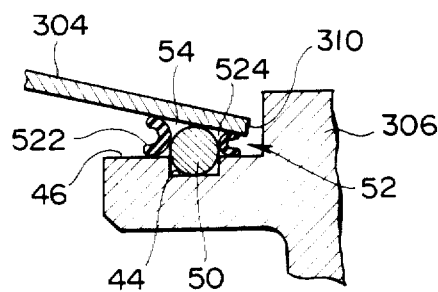
FIG. 13 is a enlarged view of the spring seat as assembled in the third embodiment of FIG. 12.

In the embodiment of FIG. 12, the sealing member 52 comprises coaxially arranged, cross-sectionally C-shaped rubber seal members 522 and 524. As shown in FIG. 13, the rubber seal members 522 and 524 are placed concentrically to either side of the metal ring 48 or 50 to define a lubricant chamber 54 or 56 in co-operation with the lower surface of the edge 310 or 312 of the spring disc 304 in contact with the top of the rubber seal members. A lubricant is retained within the lubricant chamber 54 to establish a lubricant layer between the contact surfaces of the metal ring 48 or 50 and the spring disc 304.

Figure 14:
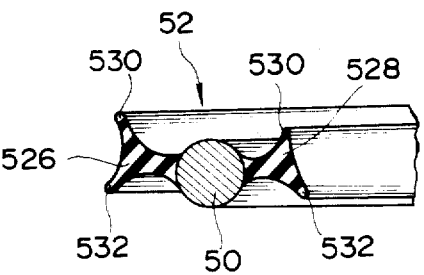
FIG. 14 is a cross-section of a modification of a sealing member in the spring seat of the third embodiment of FIG. 12.
Figure 15:
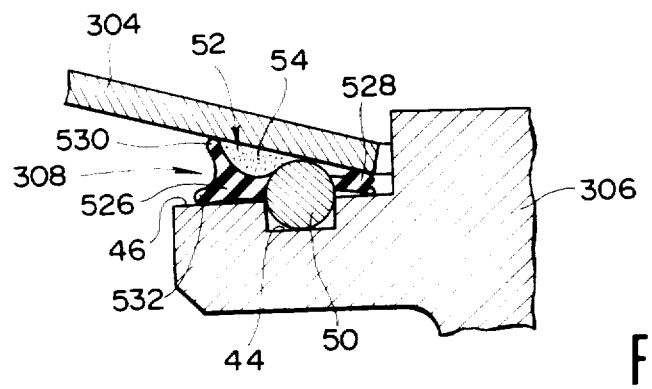
FIG. 15 is a cross-section of the sealing member of FIG. 14 as installed in the spring seat of FIG. 13.

FIG. 14 shows a modification of the rubber seal member 52. In this modification, the sealing member 52 comprises two separated rubber seal members 526 and 528 respectively secured to the opposing concentric peripheries of the metal ring 48 or 50 by the heat welding process. Each rubber seal member 526 or 528 is bifurcated into two rib portions 530 and 532 which extend from a portion of the seal member that is attached to the metal ring surface. The rib portion 530 is adapted to contact the lower surface of the spring disc 304 to establish an oil seal therebetween as shown in FIG. 15. On the other hand, the rib portion 532 also contacts the horizontal plane surface of the rest 305 or 308 to establish an oil seal therebetween. According to this modification, manufacture of the sealing member 52 is facilitated and the sealing member can be positioned without any difficulty.

Figure 16:
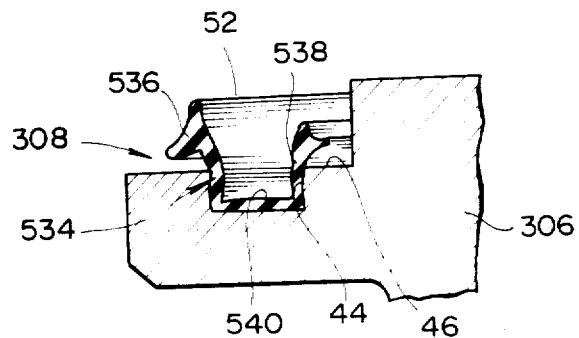
FIG. 16 is a cross-section of another modification of the sealing member in the spring seat of FIG. 13.
Figure 17:
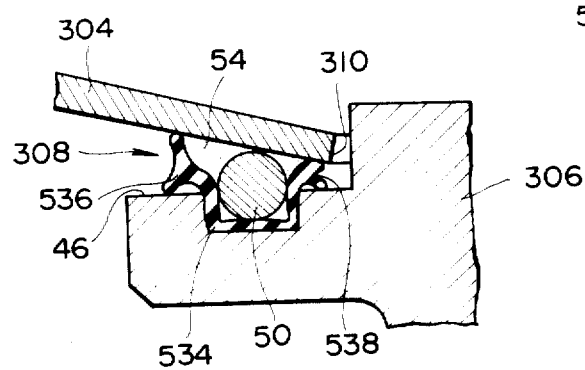
FIG. 17 is a cross-section of the sealing member of FIG. 16 as installed in the spring seat of FIG. 13.

FIGS. 16 and 17 show another modification of the sealing member 52 as applied to the foregoing third embodiment of the present invention. In this modification, the sealing member comprises a ring of cross-sectionally U-shaped rubber seal member 534 having rib portions 536 and 538 at the transverse ends thereof. The major part 540 of the rubber seal member 534 is adapted to be placed within the groove 40 or 44 and defines a space 54 to receive the metal ring 48 or 50 therein. As shown in FIG. 17, the rib portions 536 and 538 constitute the vertical walls of the lubricant chamber 54 which retains the lubricant.

Figure 18:
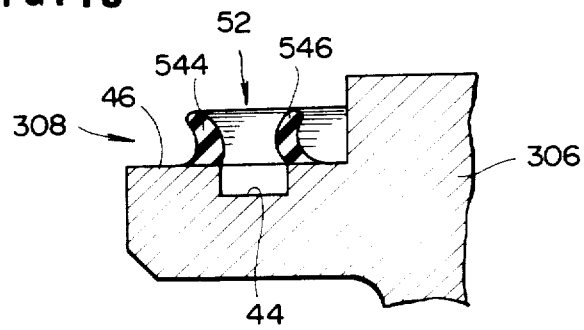
FIG. 18 is a cross-section of another modification of the sealing member in the spring seat of FIG. 13.
Figure 19:
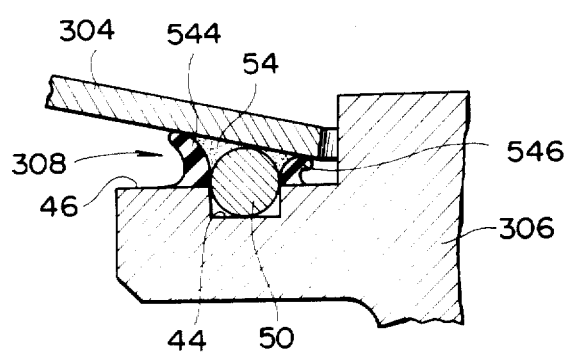
FIG. 19 is a cross-section of the spring seat of FIG. 18 as applied to the spring seat of FIG. 13.

FIGS. 18 and 19 show a further modification of the sealing member 52 to be applied to the third embodiment of the invention. As shown in FIG. 18, the sealing member comprises cross-sectionally C-shaped rubber members 544 and 546 arranged concentrically and respectively fixed to the horizontal plane 42 or 46 of the rest 305 or 308 near either edge of the groove 40 or 44. The rubber seal members 544 and 546 are adapted to mate with the lower surface of the spring disc 304 to establish an oil seal therebetween.

Figure 20:
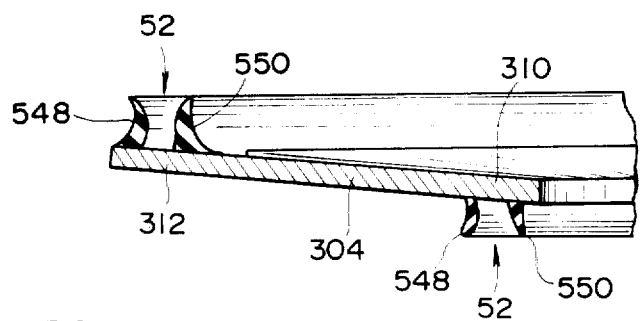
FIG. 20 is a cross-section of yet another modification of the sealing member in the spring seat of FIG. 13.
Figure 21:
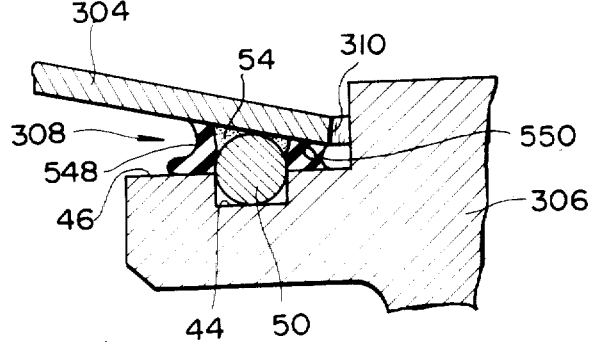
FIG. 21 in a cross-section of the sealing member of FIG. 20 as installed in the spring seat of FIG. 13.

FIGS. 20 and 21 show yet another modification of the sealing member in the third embodiment. As with the sealing members of FIGS. 12 and 18, each of the sealing members 52 comprises cross-sectionally C-shaped rubber seal members 548 and 550 arranged concentrically. The sealing members 52 are respectively fitted to the upper surface of the spring disc 304 at a point near the outer peripheral edge and to the lower surface of the spring disc at a point near the inner peripheral edge. Each of the rubber members 548 and 550 is fixed to the lower surface of the spring disc 304 and has ends which sealingly contact the mating surface of the horizontal plane 42 and 46.

According to the third embodiment as described hereabove, the friction between the metal ring and the surface of the spring disc can be satisfactorily reduced by forming a lubricant layer therebetween.

As set forth above, according to the present invention the spring seat in the shock absorber assembly serves to absorb relatively low-amplitude, high-frequency road shocks applied to the wheel axle to prevent transmission of such vibrational forces to the vehicle body. This results in effective road noise insulating effects in the shock absorber assembly and improves riding comfort.

What is claimed is:

1. A shock absorber assembly for an automotive vehicle suspension, comprising:
   a suspension strut;
   a shock absorber disposed within said suspension strut;
   a piston rod extending from a reciprocating piston disposed within said shock absorber to the vehicle body;
   a suspension coil spring wound around said suspension strut and said piston rod;
   a pair of spring seats retaining the ends of said suspension coil spring, one of said spring seats being fixed onto the outer periphery of said suspension strut and the other being secured to said piston rod near the top thereof; and
   resilient means incorporated in at least one of said spring seats for resiliently absorbing vibrations transmitted via said suspension coil spring, said resilient means being responsive to relatively low-amplitude vibrations to absorb the vibrations and to reduce their transmission between said shock absorber and said suspension strut and being responsive to relatively high-amplitude vibrations to become substantially rigid thereto.

2. The shock absorber assembly as set forth in claim 1, wherein said spring seat incorporating said resilient means comprises an outer ring member engageable to one end of said suspension coil spring, an inner ring member and a resilient ring interpositioned between said outer and inner ring members and resiliently supporting said outer ring member on said inner ring member.

3. The shock absorber assembly as set forth in claim 2, wherein said resilient ring has a spring constant which varies in such a way that the spring constant varies non-linearly with respect to load on said resilient ring and is minimized when a predetermined load is applied thereto, and said shock absorber assembly is adapted to apply said predetermined load to said resilient ring when installed in the vehicle.

4. The shock absorber as set forth in claim 3, wherein said resilient ring is substantially dish-shaped and has a vertical displacement between its inner peripheral edge and its outer peripheral edge, the vertical displacement being so chosen that said resilient ring is deformed to be flat when subject to said predetermined load.

5. The shock absorber assembly as set forth in claim 4, wherein the ratio of said vertical displacement of said resilient ring relative to the thickness thereof is chosen to be within the range from 1.2:1 to 1.5:1.

6. The shock absorber assembly as set forth in claim 2, wherein said spring seat further comprises a hard metal member inserted between the mating surfaces of said outer ring member and said resilient ring and between the mating surfaces of said inner ring member and said resilient ring.

7. The shock absorber assembly as set forth in claim 6, wherein said metal member has a substantially circular cross-section.

8. The shock absorber as set forth in claim 6, wherein said metal member has a Rockwell hardness value less than that of said resilient ring.

9. The shock absorber assembly as set forth in claim 8, wherein the hardnesses of said metal member and said resilient ring are so related in Rockwell hardness that $|H_S - H_D| = 10$, wherein $H_S$ is the hardness value of the metal ring and $H_D$ is the hardness value of the resilient ring.

10. A shock absorber assembly for an automotive vehicle suspension, comprising:
    a suspension strut;
    a shock absorber disposed within said suspension strut;
    a piston rod extending from a reciprocating piston disposed within said shock absorber to the vehicle body;
    a suspension coil spring wound around said suspension strut and said piston rod;
    a pair of spring seats retaining the ends of said suspension coil spring, one of said spring seats being fixed onto the outer periphery of said suspension strut and the other being secured to said piston rod near the top thereof;
    resilient means incorporated in at least one of said spring seats for resiliently absorbing vibrations transmitted via said suspension coil spring, said resilient means being responsive to relatively low-amplitude vibrations to absorb the vibrations and to relatively high-amplitude vibrations to become rigid, said resilient means comprising an outer ring member engageable to one end of said suspension coil spring, and an inner ring member to be fitted to one of said suspension strut and said piston rod and a resilient ring interpositioned between said outer and inner ring members, said resilient ring resiliently supporting said outer ring member on said inner ring member, and a hard metal member inserted between the mating surfaces of said outer ring member and said resilient ring and between the mating surfaces of said inner ring member and said resilient ring; and
    a sealing member defining a lubricant chamber surrounding said metal member for establishing a lubricant layer between said mating surfaces.

11. A shock absorber assembly for an automotive vehicle suspension comprising:
    a suspension strut;
    a shock absorber disposed within said suspension strut;
    a piston rod extending from a reciprocating piston disposed within said shock absorber to the vehicle body;
    a suspension coil spring wound around said suspension strut and said piston rod extending from said suspension strut;
    a pair of spring seats retaining the ends of said suspension coil spring, one of said spring seats being fixed onto the outer periphery of said suspension strut and the other being fixed to the periphery of said piston rod;
    resilient means, incorporated in at least one of said spring seats, for resiliently absorbing vibrations transmitted via said suspension coil spring, said resilient means being responsive to relatively low-amplitude vibrations to be deformed to absorb the low-amplitude vibrations and being responsive to relatively high-amplitude vibrations to become substantially rigid for transmitting the high-amplitude vibrations between said suspension coil spring and said suspension strut, said resilient means including a movable resilient ring received between substantially rigid ring members; and lubricating means, encompassing the mating surfaces between said resilient ring and one of said ring members for lubrication therebetween.

12. The shock absorber assembly as set forth in claim 11, wherein said resilient ring has a non-linear characteristic rigidity that is at a minimum when a predetermined load is applied by installing the shock absorber assembly on the vehicle.

13. The shock absorber assembly as set forth in claim 12, wherein said lubricating means comprises a substantially hard metal member inserted between said mating surfaces between one of said ring member and said resilient ring.

14. The shock absorber assembly as set forth in claim 13, wherein said metal member has a substantially circular cross-section.

15. The shock absorber as set forth in claim 13, wherein said lubricating means further comprises a sealing member defining a lubricant chamber surrounding said metal member for establishing a lubricant layer between said mating surfaces.

16. A shock absorber assembly for an automotive vehicle suspension comprising:
   a suspension strut;
   a shock absorber disposed within said suspension strut;
   a piston rod extending from a reciprocating piston within said shock absorber through the top of said suspension strut;
   a suspension coil spring wound around said suspension strut and said piston rod extending from said suspension strut;
   a pair of spring seats retaining the ends of said suspension coil spring, one of said spring seats being fixed onto the outer periphery of said suspension strut and the other being fixed to the periphery of said piston rod;
   resilient means, incorporated in at least one of said spring seats, for resiliently absorbing vibrations transmitted via said suspension coil spring, said resilient means being responsive to relatively low-amplitude vibrations to be deformed to absorb the vibrations and being responsive to relatively high-amplitude vibrations to become substantially rigid for transmitting the vibrations between said suspension coil spring and said suspension strut, said resilient means including a movable resilient ring received between substantially rigid ring members, said resilient ring being substantially dish-shaped and permitting a vertical displacement between the inner peripheral edge and the outer peripheral edge thereof, said resilient ring having a vertical dimension such that said resilient ring is flat when a predetermined load is applied; and lubricating means, encompassing the mating surfaces between said resilient ring and one of said ring members for lubrication therebetween, said lubricating means including a substantially hard metal member inserted between said mating surfaces.

17. The shock absorber assembly as set forth in claim 16, wherein the ratio of said vertical displacement of said resilient ring relative to the thickness thereof is chosen within the range from 1.2:1 to 1.5:1.

18. The shock absorber as set forth in claim 16, wherein said metal member has a Rockwell hardness value less than that of said resilient ring.

19. The shock absorber assembly as set forth in claim 18, wherein the hardness of said metal member and said resilient ring are so related to Rockwell hardness as to be $|H_S - H_D| = 10$, wherein $H_S$ is hardness of the metal member and $H_D$ is hardness of the resilient ring.

20. A strut type suspension structure for an automotive vehicle comprising:
   a suspension strut enclosing therein a shock absorber;
   a suspension coil spring cooperating with said shock absorber to dampen the vibration of the vehicle;
   an upper spring seat sealing the upper end of said spring; and
   a lower spring seat seating the lower end of said spring, said lower spring seat incorporating a resilient component which is active for relatively small magnitude vibrations and prevents said small-magnitude vibrations from being transmitted between said suspension strut and said spring, said resilient component becoming rigid in response to vibrations of a relatively large magnitude to transmit said large-magnitude vibrations between said suspension strut and said spring.

21. A strut type suspension structure for an automotive vehicle, comprising:
   a suspension strut enclosing therein a shock absorber;
   a suspension coil spring cooperating with said shock absorber to dampen the vibration of the vehicle;
   an upper spring seat seating the upper end of said spring; and
   a lower spring seat seating the lower end of said spring, said lower spring seat having a resilient component movable between first position in which said resilient component is substantially flexible for absorbing vibrations and a second position in which said resilient component is substantially rigid, said resilient component being maintained at said first position while vibration magnitude is lower than a predetermined value and movable to said second position in response to a vibration of larger magnitude than said predetermined value.

* * * * *